United States Patent
Turlikov et al.

(10) Patent No.: US 9,131,246 B2
(45) Date of Patent: Sep. 8, 2015

(54) DETECTING ARTIFACTS IN QUANTIZATION NOISE IN IMAGES COMPRESSES USING DISCRETE COSINE TRANSFORMS

(75) Inventors: Andrey Turlikov, Saint-Petersburg (RU); Marat Gilmutdinov, Saint-Petersburg (RU); Anton Veselov, Saint-Petersburg (RU)

(73) Assignee: Intel Corporation, Santa Clara, CA (US)

(*) Notice: Subject to any disclaimer, the term of this patent is extended or adjusted under 35 U.S.C. 154(b) by 576 days.

(21) Appl. No.: 13/512,920

(22) PCT Filed: Dec. 1, 2009

(86) PCT No.: PCT/RU2009/000659
§ 371 (c)(1),
(2), (4) Date: May 31, 2012

(87) PCT Pub. No.: WO2011/068429
PCT Pub. Date: Jun. 9, 2011

(65) Prior Publication Data
US 2012/0236932 A1    Sep. 20, 2012

(51) Int. Cl.
*H04N 7/30* (2006.01)
*H04N 19/60* (2014.01)
(Continued)

(52) U.S. Cl.
CPC .............. *H04N 19/60* (2014.11); *G06T 7/0002* (2013.01); *H04N 19/86* (2014.11); *G06T 2207/20021* (2013.01); *G06T 2207/20052* (2013.01); *G06T 2207/30168* (2013.01)

(58) Field of Classification Search
CPC ......... H04N 11/04; H04N 7/12; H04N 11/02; H04N 7/30; H04N 19/86; H04N 19/527; H04N 19/48; H04N 19/117; H04N 19/61; H04N 19/80; H04N 19/176; H04N 19/14; H04B 1/66; G06K 9/46; G06K 9/36
USPC .................. 375/40.2, 240.29, 240.03, 240.12, 375/240.18, 240.24, 240.2
See application file for complete search history.

(56) References Cited

U.S. PATENT DOCUMENTS 5,805,727 A * 9/1998 Nakano .......................... 382/195
5,844,614 A * 12/1998 Chong et al. .............. 375/240.24
(Continued)

FOREIGN PATENT DOCUMENTS

| CN | 1525399 | 9/2004 |
|---|---|---|
| RU | 2276472 | 5/2006 |
| WO | WO02/102086 | 12/2002 |

OTHER PUBLICATIONS

"Compression Artifacts in Modern Video Coding and State-of-the Art Means of Compensation", by Andreas Unterweger, University of Salzburg, Austria, 2010.*

(Continued)

*Primary Examiner* — Dave Czekaj
*Assistant Examiner* — Dramos I Kalapodas
(74) *Attorney, Agent, or Firm* — Trop, Pruner & Hu, P.C.

(57) ABSTRACT

An artifact in a discrete cosine transform based decoder output may be detected by developing a set of templates. An average intensity within each block in a reconstructed picture is calculated (34). The differences of each pixel value from the average output intensity within each block is determined (36). That difference is then multiplied by one of the templates within each block and the results of the multiplications are summed to obtain a calculated result (38). The calculated result is then compared to a threshold to detect an artifact such as ringing or mosquito noise artifacts (40).

30 Claims, 3 Drawing Sheets

(51) Int. Cl.
  *G06T 7/00*   (2006.01)
  *H04N 19/86*  (2014.01)
  *H04N 11/04*      (2006.01)
  *G06K 9/46*       (2006.01)

(56) References Cited

U.S. PATENT DOCUMENTS

| | | | |
|---|---|---|---|
| 6,188,799 B1* | 2/2001 | Tan et al. | 382/260 |
| 6,668,097 B1* | 12/2003 | Hu et al. | 382/275 |
| 6,940,523 B1* | 9/2005 | Evoy | 345/604 |
| 7,657,098 B2 | 2/2010 | Lin et al. | |
| 2002/0191951 A1* | 12/2002 | Sodeyama et al. | 386/46 |
| 2003/0053708 A1* | 3/2003 | Kryukov et al. | 382/261 |
| 2003/0091238 A1* | 5/2003 | Plaza | 382/209 |
| 2003/0095206 A1* | 5/2003 | Wredenhagen et al. | 348/448 |
| 2003/0099290 A1* | 5/2003 | Chen | 375/240.03 |
| 2004/0170299 A1* | 9/2004 | Macy et al. | 382/100 |
| 2006/0245499 A1* | 11/2006 | Chiu et al. | 375/240.18 |
| 2006/0245506 A1* | 11/2006 | Lin et al. | 375/240.29 |
| 2006/0268981 A1* | 11/2006 | Owens | 375/240.03 |
| 2007/0076972 A1* | 4/2007 | Chiu | 382/261 |
| 2008/0037893 A1* | 2/2008 | Okumichi et al. | 382/268 |
| 2008/0240555 A1* | 10/2008 | Nanu et al. | 382/167 |
| 2009/0103812 A1* | 4/2009 | Diggins | 382/191 |
| 2010/0002953 A1* | 1/2010 | Kirenko et al. | 382/268 |
| 2011/0007971 A1* | 1/2011 | Karkkainen | 382/190 |

OTHER PUBLICATIONS

"DCT Quantization Noise in Compressed Images", by Mark A. Robertson et al., LISA the University of Notre Dame Feb. 23, 2004.*

"Adaptive Filtering Techniques for Acquisition Noise and Coding Artifacts of Digital Pictures", by Jie Xiang Yang, PhD Thesis, RMIT University Aug. 2010.*

Chinese Office Action dated Jun. 24, 2014 from State Intellectual Property Office of the People's Republic of China of Chinese Patent Application No. 200980163365.3 (English translation) (11 pages).

* cited by examiner

DETECTING ARTIFACTS IN QUANTIZATION NOISE IN IMAGES COMPRESSES USING DISCRETE COSINE TRANSFORMS

BACKGROUND

This relates generally to compression of images, including still images and video images, using discrete cosine transform (DCT). More particularly, it relates generally to detecting artifacts resulting from the lossy nature of quantization of discrete cosine transform coefficients.

Conventional discrete cosine transform based video encoder divides each frame into non-overlapping squares called macroblocks. Each macroblock can be processed in either an intra or inter mode. In the intra mode, the encoder uses reconstructed data of only the current frame. In the inter mode, the encoder uses data from previously processed frames as well.

Data obtained in the intra and inter modes is denoted by the term "prediction error". The prediction error should be divided into W*W blocks for further discrete cosine transform and transform coefficients quantization. A typical value of W is eight. Data is recovered using an inverse discrete cosine transform applied to the dequantized discrete DCT coefficients. Applying quantization-dequantization procedures leads to data losses. Thus, the difference between original and reconstructed data will be called "quantization noise". Quantization noise leads to a specific visual error called an "artifact." Among the artifacts are blocking, ringing artifacts, which are vertical or horizontal bars within a block and mosquito noise, which looks like a cloud of insects around the strong edges in the reconstructed image.

DETAILED DESCRIPTION

In accordance with some embodiments of the present invention, artifacts may be detected from the decoder's output. The artifacts that may be detected, in some embodiments, include ringing artifacts and mosquito noise.

Figure 1:
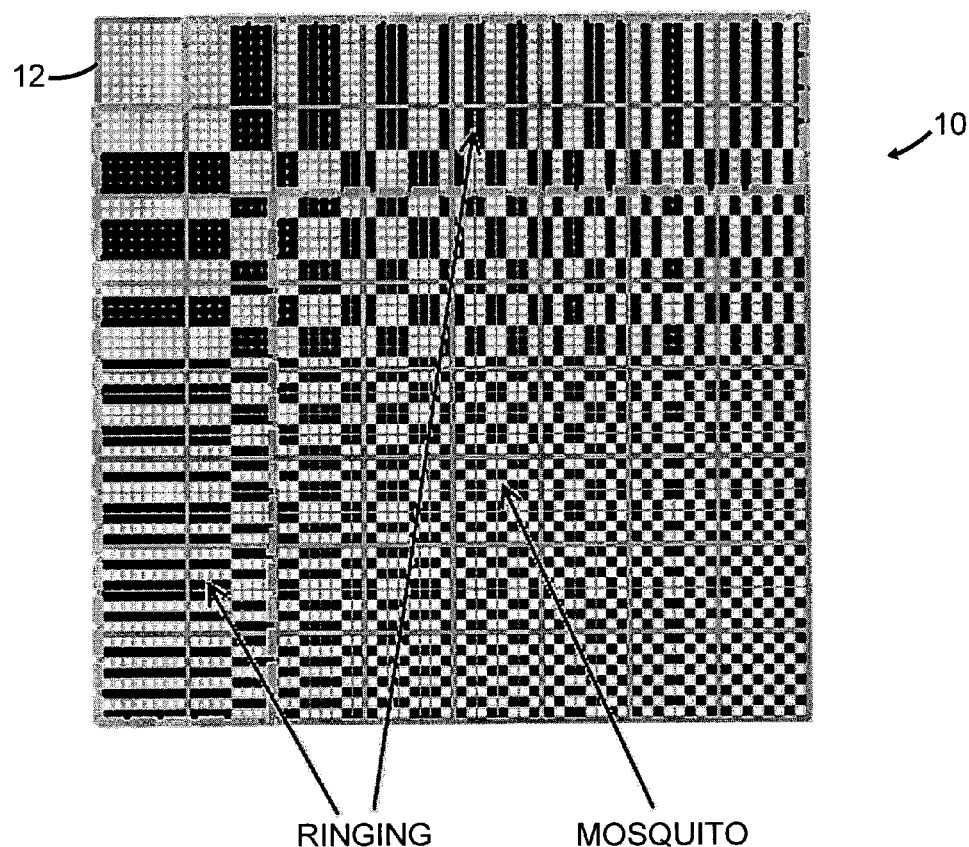
FIG. 1 is a depiction of all of the templates that may be used in one embodiment of the present invention.

A set of templates is determined for each artifact class, namely, ringing or mosquito noise artifacts. A set of templates, according to one embodiment, is shown in FIG. 1. It includes templates for ringing artifacts and templates for mosquito artifacts, as indicated. The template 12 is not used.

Each template have an 8×8 size, in one embodiment. The template coefficients have a value set that includes only −1 (black element) and +1 (white element). The total number of templates for all classes may be 63, in one embodiment. Templates are used for artifact class determination.

Figure 2:
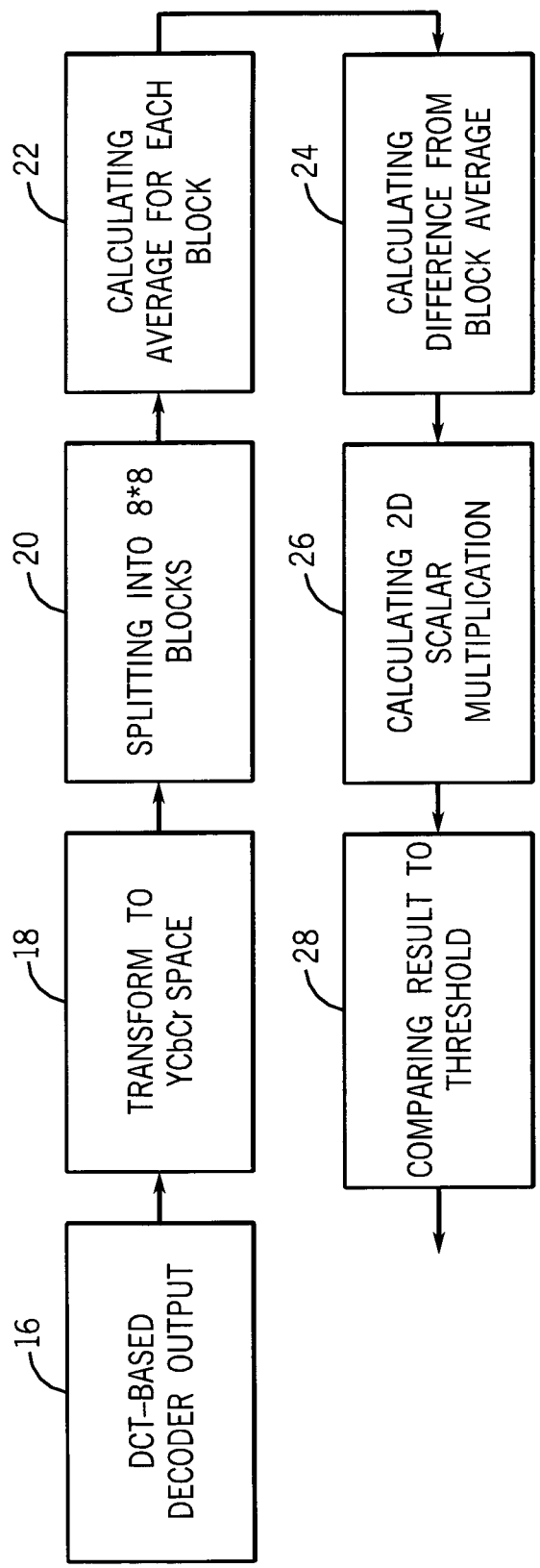
FIG. 2 is a flow chart for one embodiment of the present invention.

Thus, referring to FIG. 2, the output of DCT-based decoder 16 may include the artifacts that need to be detected. The decompressed output frame is transformed into the YCbCr format, in one embodiment, because many video encoders and decoders operate with this picture format. In the following discussion, the Y, Cb, and Cr color components are processed independently. However, in some embodiments, separate processing may not be used. Thus, the following procedure is used for each 8×8 block, in one embodiment, of each color component in the current frame (block 20). Thus, the transformer 18 transforms the color space to the YCbCr color space, in one embodiment.

Next, in block 22, the average intensity value is calculated. The calculation of the average value "A" for the current block is as follows:

$$A = \frac{1}{64}\sum_{i=0}^{7}\sum_{j=0}^{7} p_{i,j}$$

where $p_{i,j}$ is the intensity value of a pixel with the coordinate i,j within the block in question.

Subsequently, in block 24, the difference from the average is calculated for the intensities of each pixel in the block as follows:

$$\tilde{p}_{i,j} = p_{i,j} - A$$

Then, in block 26, the 2D scalar multiplication is calculated for each template $T^k$ and the results are summed:

$$T^k = \sum_{i=0}^{7}\sum_{j=0}^{7} \tilde{p}_{i,j} * t^k_{i,j}$$

Thus, in one embodiment, a metric is calculated for each template using template values $t^k_{i,j}$, defined in FIG. 1 as '1' (white elements) or '−1' (black elements).

Finally, in block 28, the results of the 2D scalar multiplication in block 26 is compared in a comparator to a threshold thr. In other words, the metric value determined in block 26 is compared to a threshold. If the results of the 2D scalar multiplication is greater than the threshold for that particular template, then the respective artifact (i.e. either a ringing or mosquito noise artifact) is present in the block. The thresholds may be determined empirically based on experience.

Since the template has a value from −1 to +1, multiplication can be replaced by operation of sign changing for negative template values. Then the metric calculation only needs 64 additions and less than 64 sign changes, in one embodiment. All metrics can be calculated across for a current block, in one embodiment. Since the blocks are processed separately, they can also be handled simultaneously using parallel processing, in one embodiment. Since the calculated metric was estimating level for a single discrete cosine transform coefficient, it can be used for further filtration of this block.

Figure 3:
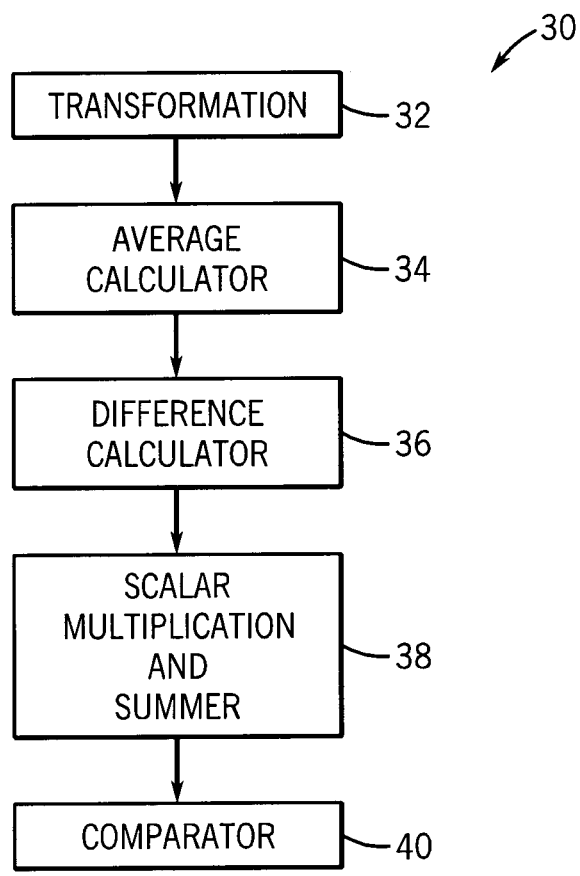
FIG. 3 is a schematic depiction of one embodiment.

The output from the discrete cosine transform based decoder is transformed into the YCbCr space in the transformation unit 32 of the apparatus 30, shown in FIG. 3. After the picture is split into 8×8 blocks, the average for each block is calculated in the average calculator 34. Then the difference from the block average is calculated in the difference calculator 36. Next, the scalar multiplication and summer unit 38 multiplies that difference by one of the templates within each block and sums to obtain a calculated result. Finally, the comparator 40 compares the result to a threshold to determine the artifact class.

In some embodiments, the sequence shown in FIG. 2 may be implemented in software, hardware, or firmware. In a software implemented embodiment, the sequence may be implemented by a series of computer executable instructions that are stored in a semiconductor, optical, or magnetic memory that constitutes a computer readable medium.

Figure 4:
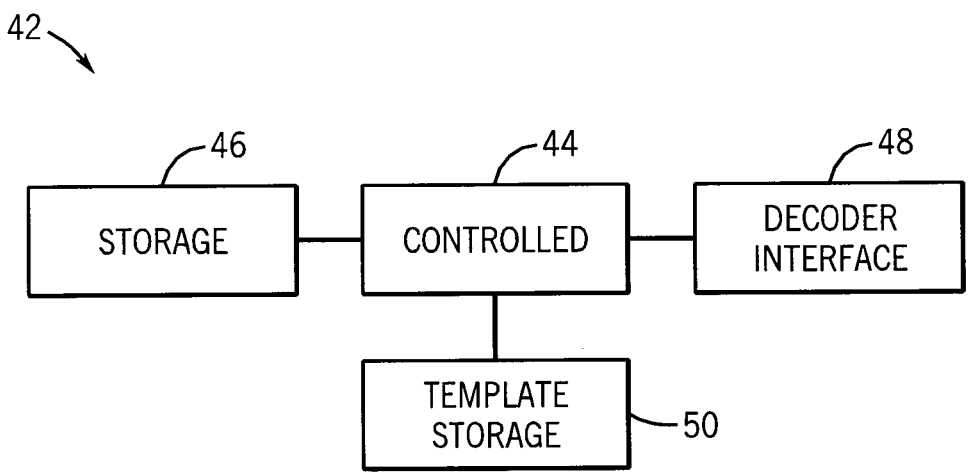
FIG. 4 is a schematic depiction of a computer implemented embodiment.

In one embodiment, implemented in software, the sequence instructions shown in FIG. 2 may be stored within a computer 42 and, particularly, within a storage 46 therein, as shown in FIG. 4. The computer 42 may include a controller 44 for executing the instructions. It may also include a storage 50 to store the templates. A decoder interface 48 may receive the discrete transform based decoder output, converted to the YCbCr space, and may provide the information to the controller 44, in some embodiments.

In one embodiment, the method may be implemented using field programmable gate array schemes. Independent noise detection may allow use of fast ways for parallel block processing in some embodiments. Thus, the techniques described herein can be implemented with low complexity and high speed in some cases. The maximum count of operations is 64 additions, 32 sign changes per template, in one embodiment, with a maximum template count of 63. Also, 64 additions and one right shift should be used for the average value calculation. Thus, the calculations may be done very economically. In some embodiments, only the current frame is used and there is no need to use previous frames.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:

1. A method comprising:
developing, in a hardware compressor, a set of templates for detecting artifacts in the output of a discrete cosine transform encoded picture;
calculating an average intensity within each block in a reconstructed picture;
determining the difference of each pixel value from the average output intensity within each block;
multiplying that difference by one of the templates within each block and scanning to obtain a calculated result; and
comparing the calculated result to a threshold to detect an artifact.

2. The method of claim 1 including receiving a discrete cosine transform based decoder output and transforming that output to the YCbCr space.

3. The method of claim 2 including transforming the output in the YCbCr space into 8×8 blocks.

4. The method of claim 1 including developing a set of templates for mosquito noise artifacts.

5. The method of claim 1 including developing a set of templates for ringing artifacts.

6. The method of claim 1 wherein comparing the calculated result to a threshold includes detecting one of ringing or mosquito noise artifacts.

7. The method of claim 1 wherein developing a set of templates including developing templates in which the values of −1 and +1 are depicted.

8. The method of claim 7 wherein said −1 values are implemented by black elements and the +1 values are implemented by white elements.

9. The method of claim 1 wherein developing a set of templates includes developing a set of 63 templates.

10. The method of claim 1 wherein multiplying includes two dimensional scalar multiplication.

11. A non-transitory computer readable medium storing instructions to cause a computer to:
calculate an average intensity within each block in a reconstructed picture;
determine the difference of each pixel value from the average output intensity within each block;
multiply that difference by a template within each block, said template for detecting artifacts in the output of a discrete cosine transform encoded picture;
summing the multiplication of the differences for a set of templates to obtain a calculated result; and
comparing the calculated result to a threshold to detect an artifact.

12. The medium of claim 11 further storing instructions to receive a discrete cosine transform based decoder output and to transform that output to the YCbCr color space.

13. The medium of claim 12 further storing instructions to transform the output in the YCbCr color space into 8×8 blocks.

14. The medium of claim 11 further storing instructions to develop a set of templates for mosquito noise artifacts.

15. The medium of claim 11 further storing instructions to develop a set of templates for ringing artifacts.

16. The medium of claim 11 further storing instructions to detect one of ringing or mosquito noise artifacts by comparing the calculated result to a threshold.

17. The medium of claim 11 further storing instructions to develop templates in which the values of −1 and +1 are depicted.

18. The medium of claim 17 further storing instructions wherein said −1 values are implemented by black elements and the +1 values are implemented by white elements.

19. The medium of claim 11 further storing instructions to develop a set of 63 templates.

20. The medium of claim 11 further storing instructions to use two dimensional scalar multiplication to multiply that difference by one of the templates within said block.

21. An apparatus comprising:
a first device to calculate average intensity within each block in a reconstructed picture;
a second device to determine the difference of each block from the average output intensity within each block;
a third device to multiply that difference by a template within each block, said template for detecting artifacts in the output of a discrete cosine encoded picture;
a summer to sum the multiplication of the differences for a set of templates to obtain a calculated result; and
a comparator to compare the calculated result to a threshold to detect an artifact.

22. The apparatus of claim 21 wherein said first, second, and third devices, said summer and said comparator are all implemented by a single controller.

23. The apparatus of claim 21 wherein said first device to calculate an average intensity in the YCbCr color space.

24. The apparatus of claim 21 further including a module to transform the output of a decoder into 8×8 blocks.

25. The apparatus of claim 21 to detect mosquito noise artifacts.

26. The apparatus of claim 21 to detect ringing noise artifacts.

27. The apparatus of claim 21 wherein said the third device is a two dimensional scalar multiplication device.

28. The apparatus of claim 21 including a transformation unit to transform the output of a decoder to the YCbCr space.

29. The apparatus of claim 28 wherein said transformation unit to transform said output into 8×8 blocks.

30. The apparatus of claim 21 to use a plurality of templates that represent values of −1 and +1 with white and black elements.

\* \* \* \* \*